United States Patent
Rixon et al.

(10) Patent No.: US 6,662,677 B2
(45) Date of Patent: Dec. 16, 2003

(54) ADJUSTABLE PEDAL ASSEMBLY (BANANA ROD)

(75) Inventors: Christopher Rixon, Tecunseh (CA); Anthony Markham, Windsor (CA)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 10/034,280

(22) Filed: Dec. 28, 2001

(65) Prior Publication Data

US 2002/0053254 A1 May 9, 2002

Related U.S. Application Data

(63) Continuation of application No. 09/542,653, filed on Apr. 4, 2000, now abandoned.
(60) Provisional application No. 60/159,663, filed on Oct. 15, 1999.

(51) Int. Cl.[7] .................................................. G05G 1/14
(52) U.S. Cl. ............................. 74/512; 74/513; 74/560
(58) Field of Search ......................... 74/512, 513, 560, 74/522

(56) References Cited

U.S. PATENT DOCUMENTS

| | | | | |
|---|---|---|---|---|
| 3,643,524 A | * | 2/1972 | Herring | 74/512 |
| 3,643,525 A | * | 2/1972 | Gibas | 74/512 |
| 3,691,868 A | * | 9/1972 | Smith | 74/512 |
| 4,875,385 A | * | 10/1989 | Sitrin | 74/512 |
| 5,010,782 A | | 4/1991 | Asano et al. | 74/512 |
| 5,013,930 A | | 5/1991 | Spakowski et al. | 307/10.1 |
| 5,078,024 A | * | 1/1992 | Cicotte et al. | 74/560 X |
| 5,086,663 A | | 2/1992 | Asano et al. | 74/512 |
| 5,460,061 A | * | 10/1995 | Redding et al. | 74/513 X |
| 5,632,183 A | | 5/1997 | Rixon et al. | 74/512 |
| 6,289,761 B1 | | 9/2001 | Reynolds et al. | 74/512 |

* cited by examiner

*Primary Examiner*—Vinh T. Luong
(74) *Attorney, Agent, or Firm*—Howard & Howard

(57) ABSTRACT

Four embodiments of an adjustable pedal assembly wherein a pedal lever is adjustable along a rod. Each assembly is characterized by the rod (116, 216, 316 and 416) being arcuate or curved, e.g., in an arc, between its connection to a support (112, 212, 312 and 412) and its distal end for changing the angle of the longitudinal axis of the pedal lever (118, 218, 318 and 418) relative to the support (112, 212, 312 and 412) during the adjustment of the pedal lever (118, 218, 318 and 418) along the rod (116, 216, 316 and 416). Consequently, the angle of the pedal pad (120, 220, 320 and 420) is changed to accommodate different operators

11 Claims, 4 Drawing Sheets

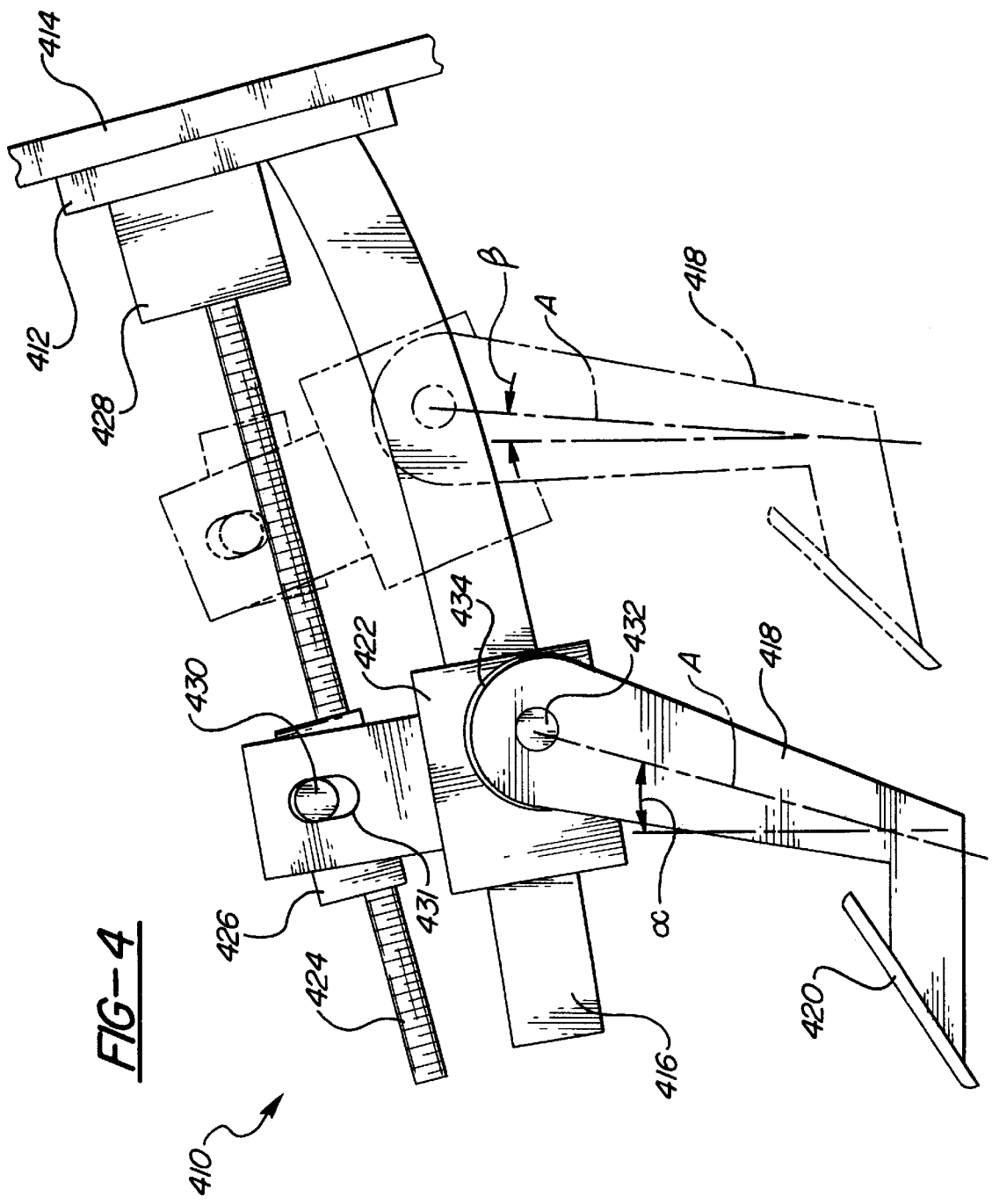

ADJUSTABLE PEDAL ASSEMBLY (BANANA ROD)

RELATED APPLICATION

This application is a continuation of application Ser. No. 09/542,653, filed Apr. 4, 2000, now abandoned which claims priority to provisional application Ser. No. 60/159,663 filed Oct. 15, 1999.

BACKGROUND OF THE INVENTION

1. Field of the Invention

The subject invention relates to an adjustable pedal assembly for adjusting the operational position of the pedal to accommodate different operators.

2. Description of the Prior Art

The adjustable pedal assemblies adjust the operational position of the pedal lever, and, consequently, the operational position of the pad at the lower end of the pedal lever, by a linkage system for moving the pedal lever in an arc or a rod supporting the pedal lever for rectilinear movement along the rod. The subject invention is an improvement for the rod-supported pedal lever. A support mounts the assembly to a vehicle and a rod extends from the support to a distal end. A pedal lever having a longitudinal axis extending between an upper end and a lower end is included for operational movement from an operational position in response to a force from a vehicle operator. A mechanism supports the pedal lever on the rod for the operational movement in response to the force from an operator and for adjustment of the operational position of the pedal lever along the rod. Examples of prior art assemblies are disclosed in U.S. Pat. Nos. 5,010,782 and 5,086,663 to Asano et al and U.S. Pat. No. 5,632,183 to Rixon et al.

As the operational position of the pedal lever is adjusted by moving the mechanism along the rod, the angle of the pad at the lower end of the pedal lever remains constant. However, it is desirable to change the angle of presentation of the pedal pad to accommodate different angles of approach of the various different operators' foot during application of a force to move the pedal lever; that is, without adjusting the position of the pad relative to the pedal lever.

SUMMARY OF THE INVENTION AND ADVANTAGES

The subject invention includes an adjustable pedal assembly comprising a support for mounting the assembly to a vehicle and a rod extending from the support to a distal end. A pedal lever having a longitudinal axis extending between an upper end and a lower end is included for operational movement from an operational position in response to a force from a vehicle operator. A mechanism supports the pedal lever on the rod for the operational movement in response to the force from an operator and for adjustment of the operational position of the pedal lever along the rod. The assembly is characterized by the rod being arcuate for changing the angle of the longitudinal axis of the pedal lever relative to the support structure during the adjustment of the pedal lever along the rod.

Accordingly, the subject invention provides an adjustable pedal assembly of the type wherein the operational position of the pedal lever is adjusted along a rod and the angle of presentation of the pedal pad is changed to accommodate different angles of approach of the various different operators' foot during application of a force to move the pedal lever.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a schematic view of a fourth embodiment of the invention.

DETAILED DESCRIPTION OF THE PREFERRED EMBODIMENT

Figure 1:
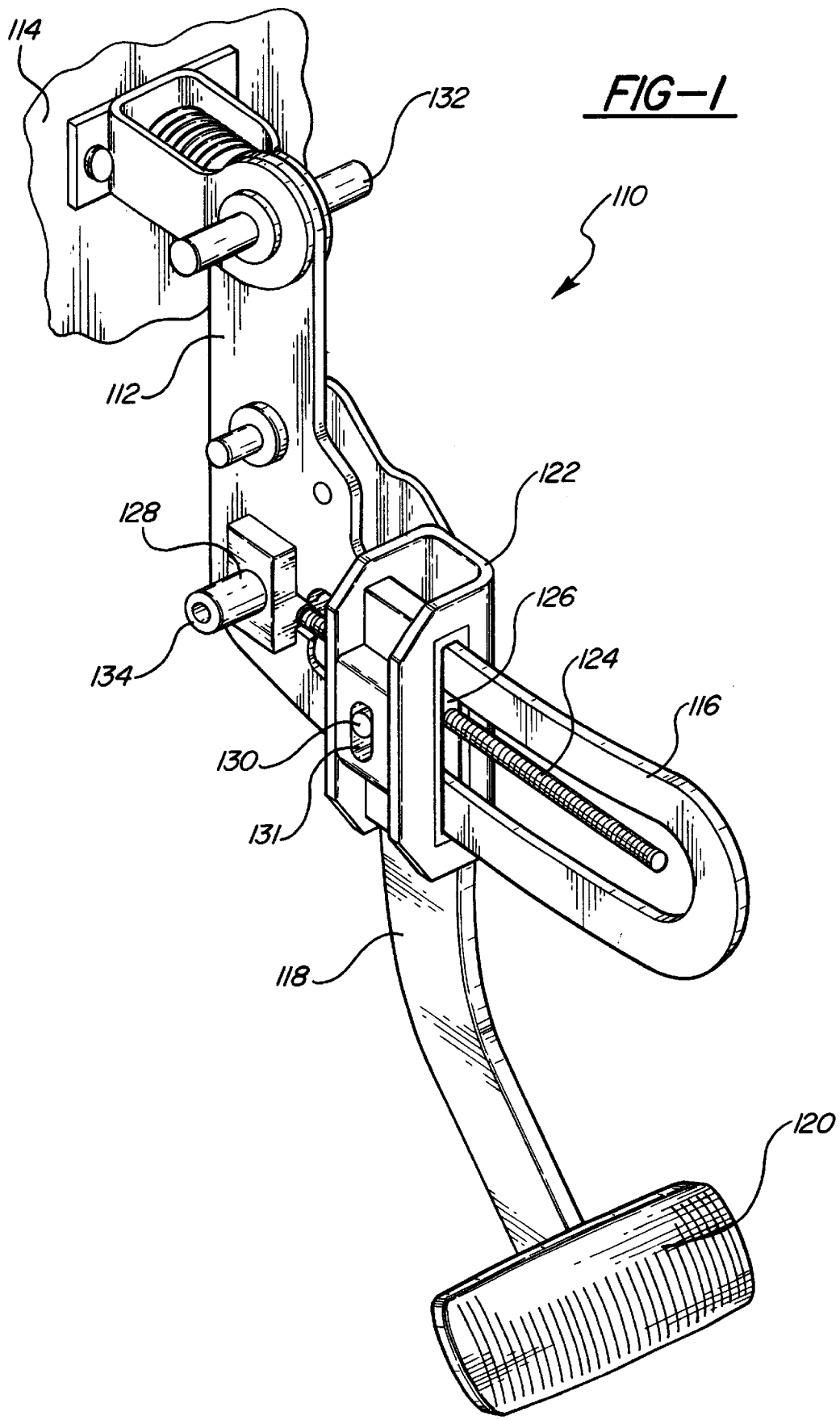
FIG. 1 is a perspective view of a first embodiment of the invention.

Referring to the Figures, wherein like numerals differing by one hundred indicate like or corresponding parts throughout the several views, an adjustable pedal assembly incorporating the subject invention is generally shown respectively at 110, 210, 310 and 410.

Each assembly includes a support 112, 212, 312 and 412 for mounting the assembly to a vehicle, such as to the firewall 114, 214 and 414.

A rod 116, 216, 316 and 416 extends from the support 112, 212, 312 and 412 to a distal end.

A pedal lever 118, 218, 318 and 418 having a longitudinal axis (as illustrated at A in FIGS. 2 and 4) extends between an upper end and a lower end for operational movement from an operational position in response to a force from a vehicle operator. A pedal pad 120, 220, 320 and 420 is fixed to the pedal lever 118, 218, 318 and 418 so that the angle of presentation remains constant relative to the axis of the pedal lever 118, 218, 318 and 418.

A mechanism 122, 222, 322 and 422 supports the pedal lever 118, 218, 318 and 418 on the rod 116, 216, 316 and 416 for the operational movement in response to the force from an operator and for adjustment of the operational position of the pedal lever 118, 218, 318 and 418 along the rod 116, 216, 316 and 416.

Figure 2:
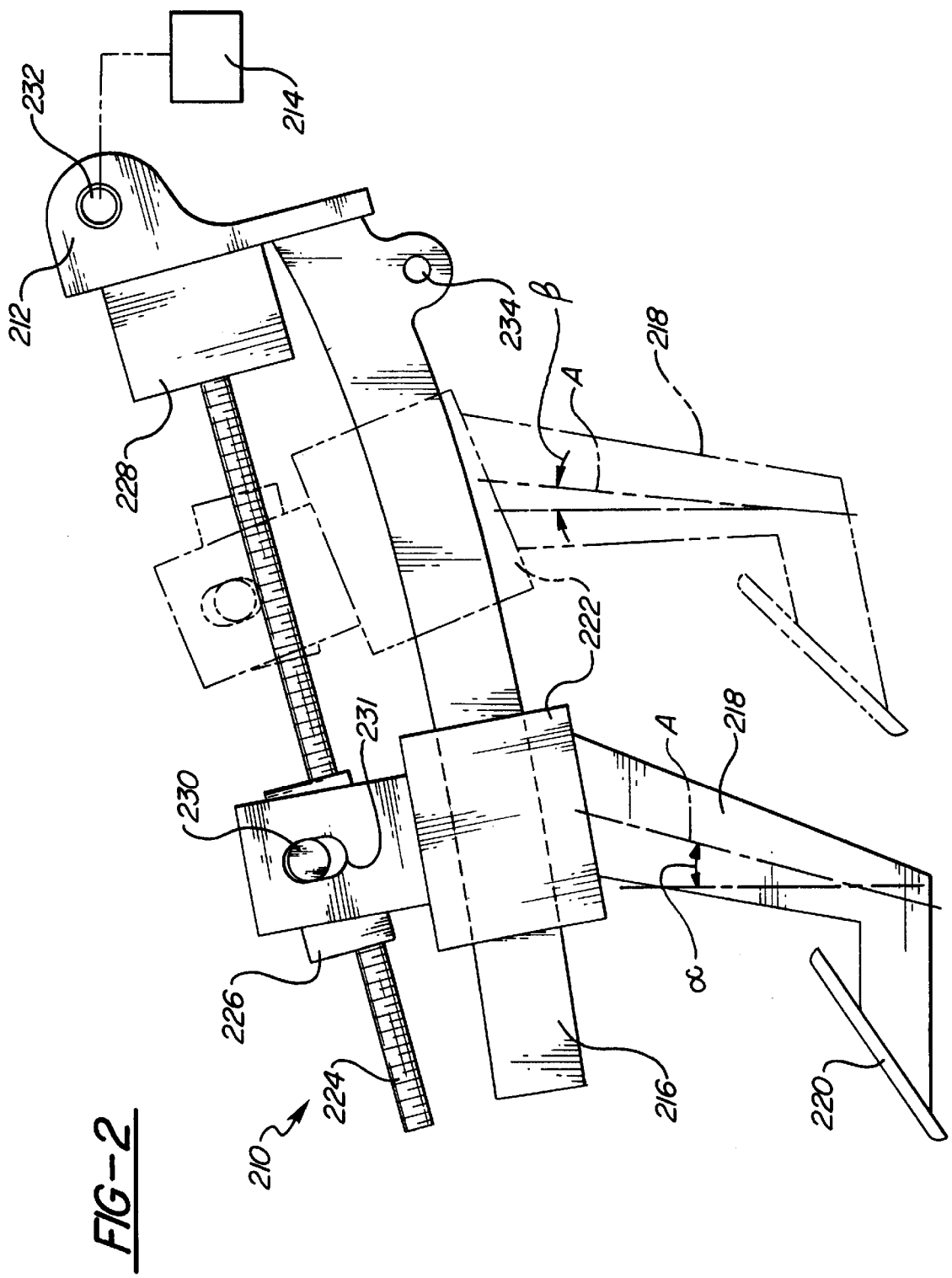
FIG. 2 is a schematic view of a second embodiment of the invention.

The assembly is characterized by the rod 116, 216, 316 and 416 being arcuate or curved, e.g., in an arc, between its connection to the support 112, 212, 312 and 412 and the distal end for changing the angle of the longitudinal axis of the pedal lever 118, 218, 318 and 418 (from angle $\alpha$ to angle $\beta$ as shown in FIGS. 2 and 4) relative to the support 112, 212, 312 and 412 during the adjustment of the pedal lever 118, 218, 318 and 418 along the rod 116, 216, 316 and 416, as illustrated by the phantom positions in FIGS. 2 and 4.

The mechanism 122, 222, 322 and 422 includes a drive system for adjusting the operational position of the pedal lever 118, 218, 318 and 418 along the rod 116, 216, 316 and 416.

More specifically, in the embodiments of FIGS. 1, 2 and 4, the drive system includes a threaded screw 124, 224 and 424 and a threaded nut 126, 226 and 426 threadedly engaging the screw 124, 224 and 424. A power unit 128, 228 and 428 rotates the screw 124, 224 and 424 to move the nut 126, 226 and 426, and the nut 126, 226 and 426 is connected to the pedal lever 118, 218 and 418 for moving the pedal lever 118, 218 and 418 along the rod 116, 216 and 416 in response to rotation of the screw 124, 224 and 424. A rotational connection defined by a pin 130, 230 and 430 connects the nut 126, 226 and 426 to the pedal lever 118, 218 and 418 for accommodating the changing angle of the longitudinal axis of the pedal lever 118, 218 and 418 relative to the screw 124, 224 and 424 during the adjustment of the pedal lever 118, 218 and 418 along the rod 116, 216 and 416. The screw 124, 224 and 424 is straight and a lost motion connection comprising an elongated slot 131, 231 and 431 is disposed between the nut 126, 226 and 426 and the pedal lever 118, 218 and 418 for accommodating the change in distance between the screw 124, 224 and 424 and the rod 116, 216 and 416 as the nut 126, 226 and 426 moves along the screw 124, 224 and 424. The slot 131, 231 and 431 is in the mechanism 122, 222 and 422 and surrounds the pin connection 130, 230 and 430 to the nut 126, 226 and 426. The power unit 128, 328 and 428 includes a gear box which is rotated by a rotary cable or electric motor to rotate the screw 124, 224 and 424. The rotational connection 130, 230 and 430 comprises a pin which supports the nut 126, 226 and 426 for rotation relative to the mechanism 122, 222 and 422 as it moves along the curved rod 116, 216 and 416.

In the embodiment of FIG. 1, the rod 116 is a plate having a central slot with the screw 124 disposed in the slot and the nut 126 disposed in the slot. The mechanism 122 includes a bracket having spaced flanges with the rod 116 extending through holes or slots in the bracket. In the embodiments of FIGS. 2 and 4, the screw 224 and 424 is disposed in spaced relationship to the rod 216 and 416 with an extension of the mechanism 222 and 422 supporting the 230 and 430 which supports the nut 226 and 426.

Figure 3:
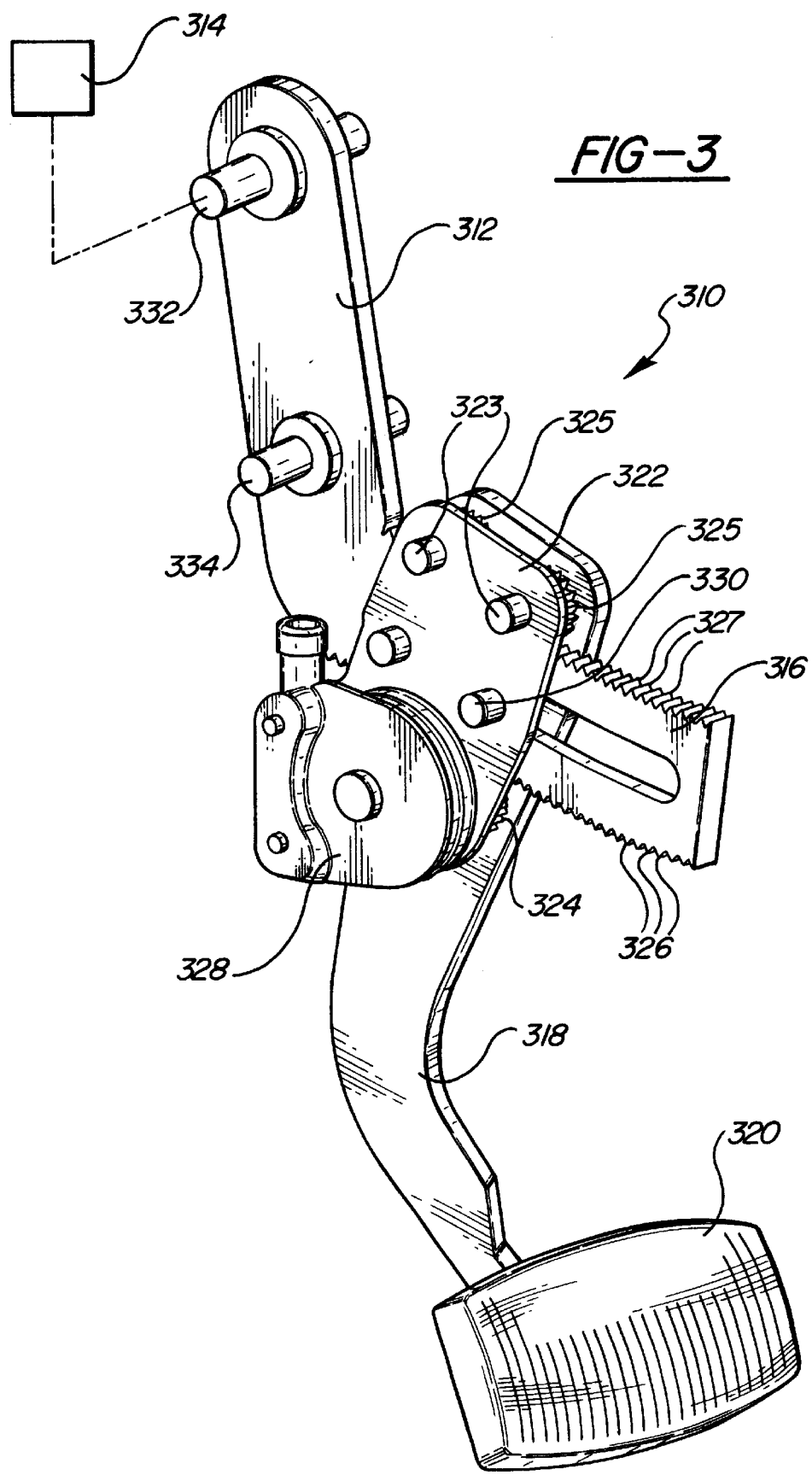
FIG. 3 is a perspective view of a third embodiment of the invention.

In the embodiment of FIG. 3, the drive system includes at least one gear 324 in meshing engagement with the rod 316 and a power unit 328 for rotating the gear 324 for moving the pedal lever 318 along the rod 316 in response to rotation of the gear 324. The power unit 328 is driven by a rotary cable to rotate a gear box which, in turn, rotates the gear 324. The rod 316 comprises a plate with top and bottom edges and rack teeth 326 disposed along the bottom edge and in the meshing engagement with the gear 324. The mechanism 322 includes a plurality of idler shafts 323 which support idler gears 325 engaging teeth 327 along the top edge of the plate comprising the rod 316. Additional guide pins 330 extend through a central slot in the rod 316 for guiding the mechanism along the rod 316.

In the embodiments of FIGS. 1, 2 and 3, a pivotal connection 132, 232 and 332 pivotally connects the support 112, 212 and 312 to a vehicle 114, 214 and 314 so that the rod 116, 216 and 316 pivots about the pivotal connection 132, 232 and 332 during the operational movement in response to the force from an operator. To this end, a connector 134, 234 and 334 is provided on the support 112, 212 and 312 for connection to a control element to transmit forces to a brake, throttle linkage, or the like. In the embodiment of FIG. 4, a pivotal connection 432 pivotally connects the pedal lever 418 to the mechanism 422 so that the pedal lever 418 pivots relative to the rod 416 about the pivotal connection 432 during the operational movement in response to the force from an operator. The support 412 is fixedly attached to the vehicle structure 414. A signal generating device 434 is included for generating an electronic signal in response to the pedal lever 418 pivoting relative to the mechanism 422.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An adjustable pedal assembly comprising;
   a support (112, 212, 312 and 412) for mounting said assembly;
   an arcuate male rod (116, 216, 316 and 416) cantilevered from and extending in an arcuate path from said support (112, 212, 312 and 412) to a distal end,
   a pedal lever (118, 218, 318 and 418) having a longitudinal axis (A) extending between an upper end and a lower end for operational movement from an operational position in response to a force,
   a female mechanism (122, 222, 322 and 422) surrounding said rod for movement along said rod (116, 216, 316 and 416),
   said pedal lever (118, 218, 318 and 418) depending from said female mechanism with said longitudinal axis (A) thereof extending through said mechanism for changing the angle of said longitudinal axis (A) of said pedal lever (118, 218, 318 and 418) relative to said support (112, 212, 312 and 412) during movement of said mechanism (122, 212, 312, and 412) and said operational position of said lever (118, 218, 318 and 418) in said arcuate path along said rod (116, 216, 316 and 416) independently of said operational movement.

2. An assembly as set forth in claim 1 wherein said mechanism (122, 222, 322 and 422) includes a drive system for adjusting said operational position of said pedal lever (118, 218, 318 and 418) in said arcuate path along said rod (116, 216, 316 and 416).

3. An assembly as set forth in claim 2 wherein said drive system includes a threaded screw (124, 224 and 424) and a threaded nut (126, 226 and 426) threadedly engaging said screw (124, 224 and 424) and a power unit (128, 228 and 428) for rotating said screw (124, 224 and 424) to move said nut (126, 226 and 426), said nut (126, 226 and 426) being connected to said pedal lever (118, 218 and 418) for moving said pedal lever (118, 218 and 418) along said rod (116, 216 and 416) in response to rotation of said screw (124, 224 and 424).

4. An assembly as set forth in claim 3 including a rotational connection (130, 230 and 430) between said nut (126, 226 and 426) and said pedal lever (118, 218 and 418) for accommodating said changing angle of said longitudinal axis (A) of said pedal lever (118, 218 and 418) relative to said screw (124, 224 and 424) during said adjustment of said pedal lever (118, 218 and 418) along said rod (116, 216 and 416).

5. An assembly as set forth in claim 4 wherein said screw (124, 224 and 424) is straight and including a lost motion connection (131, 231 and 431) between said nut (126, 226 and 426) and said pedal lever (118, 218 and 418) for accommodating the change in distance between said screw (124, 224 and 424) and said rod (116, 216 and 416) as said nut (126, 226 and 426) moves along said screw (124, 224 and 424).

6. An assembly as set forth in claim 2 wherein said drive system includes at least one gear (324) in meshing engagement with said rod (316) and a power unit (328) for rotating said gear (324) for moving said pedal lever (318) along said rod (316) in response to rotation of said gear (324).

7. An assembly as set forth in claim 6 wherein said rod (316) comprises a plate with top and bottom edges and rack teeth (326) disposed along at least one of said edges and in said meshing engagement with said gear (324).

8. An assembly as set forth in claim 2 including a pivotal connection (132, 232 and 332) for pivotally mounting said support (112, 212 and 312) so that said rod (116, 216 and 316) pivots about said pivotal connection (132, 232 and 332) during said operational movement in response to the force from an operator.

9. An assembly as set forth in claim 2 including a pivotal connection (432) for pivotally connecting said pedal lever (418) to said mechanism (422) so that said pedal lever (418) pivots relative to said rod (416) about said pivotal connection (432) during said operational movement in response to the force from an operator.

10. An assembly as set forth in claim 9 including a signal generating device (433) for generating an electronic signal in response to said pedal lever (418) pivoting relative to said mechanism (422).

11. An adjustable pedal assembly comprising:
   a support (112, 212, 312 and 412) for mounting said assembly;
   a rod (116, 216, 316 and 416) extending from said support (112, 212, 312 and 412) to a distal end,
   a pedal lever (118, 218, 318 and 418) having a longitudinal axis (A) extending between an upper end and a lower end for operational movement from an operational position in response to a force,
   a mechanism (122, 222, 322 and 422) supporting said pedal lever (118, 218, 318 and 418) on said rod (116, 216, 316 and 416) and being the control of movement of said operational position of said pedal lever (118, 218, 318 and 418) along said rod (116, 216, 316 and 416),
   said rod (116, 216, 316 and 416) being arcuate to establish an arcuate path for changing the angle of said longitudinal axis (A) of said pedal lever (118, 218, 318 and 418) relative to said support (112, 212, 312 and 412) during movement of said mechanism (122, 212, 312 and 412) and said operational position of said lever (118, 218, 318 and 418) in said arcuate path along said rod (116, 216, 316 and 416) independently of said operational movement,
   said mechanism (122, 222, 322 and 422) including a drive system for adjusting said operational position of said pedal lever (118, 218, 318 and 418) along said rod (116, 216, 316 and 416),
   said drive system including a threaded screw (124, 224 and 424) and a threaded nut (126, 226 and 426) threadedly engaging said screw (124, 224 and 424) and a power unit (128, 228 and 428) for rotating said screw (124, 224 and 424) to move said nut (126, 226 and 426), said nut (126, 226 and 426) being connected to said pedal lever (118, 218 and 418) for moving said pedal lever (118, 218 and 418) along said rod (116, 216 and 416) in response to rotation of said screw (124, 224 and 424), and
   a pivotal connection (132 and 232) for pivotally connecting said support (112 and 212) so that said rod (116 and 216) pivots about said pivotal connection (132 and 232) during said operational movement in response to the force from an operator.

* * * * *